(12) United States Patent
Makhija et al.

(10) Patent No.: US 6,629,054 B2
(45) Date of Patent: Sep. 30, 2003

(54) WARRANTY CONTROLLING SOFTWARE AND DEVICE

(75) Inventors: Surender K. Makhija, Brookfield, WI (US); Steven J. Sparacino, Portage, MI (US); Thomas L. Webster, Kalamazoo, MI (US)

(73) Assignee: SPX Corporation, Charlotte, NC (US)

( * ) Notice: Subject to any disclaimer, the term of this patent is extended or adjusted under 35 U.S.C. 154(b) by 99 days.

(21) Appl. No.: 09/985,295

(22) Filed: Nov. 2, 2001

(65) Prior Publication Data

US 2002/0050163 A1 May 2, 2002

Related U.S. Application Data

(60) Provisional application No. 60/244,922, filed on Nov. 2, 2000.

(51) Int. Cl.$^7$ ................................................. G01L 3/26
(52) U.S. Cl. ...................................................... 702/113
(58) Field of Search ................. 701/33, 48; 324/545.81, 324/380, 72.5, 402; 702/113; 73/116; 350/96; 364/424

(56) References Cited

U.S. PATENT DOCUMENTS

| | | | | |
|---|---|---|---|---|
| 4,186,337 A | * | 1/1980 | Volk et al. | 324/380 |
| 4,673,868 A | * | 6/1987 | Jones, Jr. | 324/545 |
| 4,924,391 A | * | 5/1990 | Hirano et al. | 701/33 |
| 6,202,012 B1 | * | 3/2001 | Gile et al. | 701/48 |

* cited by examiner

*Primary Examiner*—John Barlow
*Assistant Examiner*—Tung S Lau
(74) *Attorney, Agent, or Firm*—Baker & Hostetler, LLP

(57) ABSTRACT

A system comprised of a computer that contains a display device such as monitor, an input device (e.g. a keyboard or a touch screen), a storage device such as a hard-drive, and software capable of collecting data. The data is collected from an adapter of which one end is attached to the computer and the other one end and attached to an automotive part. The automotive part is tested and performance data extracted. The data is sent to a remote location or to the computer where it is compiled for a wire variety of uses.

17 Claims, 2 Drawing Sheets

FIG. 2

30 — CONNECTING AN ADAPTER SO THAT A FIRST END IS CONNECTED TO A COMPUTER AND A SECOND END IS CONNECTED TO THE PART

32 — CONNECTING THE PART TO A PAIR OF SOURCE LEADS, IF THE PART REQUIRES POWER IN ORDER TO BE TESTED;

34 — TESTING THE PART BY APPLYING POWER AND ACTIVATING THE PART

36 — TRANSMITTING TEST RESULTS FROM THE PART TO THE COMPUTER

38 — COMPILING AND STORING THE TEST RESULTS

WARRANTY CONTROLLING SOFTWARE AND DEVICE

PRIORITY

This application claims priority to the provisional U.S. patent application entitled, Warranty Controlling Software and Device, filed Nov. 2, 2000, having a Ser. No. 60/244,922, the disclosure of which is hereby incorporated by reference.

FIELD OF THE INVENTION

The present invention relates generally to the testing of automotive parts. More particularly, the present invention relates to the testing of automotive parts and the gathering of data from these tests to be used not only for working ability analysis but also for use in designing and redesigning manufacturing warranties that are included with them.

BACKGROUND OF THE INVENTION

The servicing of automotive vehicles has become extremely complicated in this modem era because of factors such as the complexity of the vehicle, the inadequacy of available specifications on the vehicle and the changes in regulatory requirements applicable to the vehicle. Further, the capability of some diagnostic equipment used in diagnosing and servicing vehicles has not kept pace with changes in the vehicles. Added to these complications is a growing scarcity of personnel trained in servicing such complicated equipment. For example, whereas it had been possible to service many vehicles with internal combustion engines by checking the condition of ignition parts, adjustments of carburetors, or condition of electrical systems and replacing some or all parts, the newer vehicles have engines that do not have the older conventional ignition parts, the fuel supply is not easily adjusted, and the electrical system is sometimes separately controlled by its own built-in computer. Further, some governmental regulatory agencies prohibit some adjustments or have established operating conditions for vehicle engines that require adjustments to an engine's operation that can only be accomplished with special test equipment.

In addition, since a great majority of parts are sealed, it is not easy for a mechanic to identify with certainty whether the part is malfunctioning or not. A mechanic who feels that the part is faulty could replace the part only for the initial problem to remain. The customer returns to the mechanic with frustration and disbelief as to the mechanic's ability and honesty.

Furthermore, manufacturers and resellers of the parts usually offer a limited warranty on the parts that are sold. Depending on the warranty provided, the costs to reimburse customers for warranty related problems can be significant.

The summary of the foregoing with regard to the state of the prior art in the modem complicated and regulated vehicle diagnosis and service business, is that there is a growing need for a system that will permit a mechanic or vehicle owner to know the present condition of automotive part and be able to show to the owner or mechanic where and how the part is deficient.

Furthermore, there is a need for manufacturers to obtain data as to the performance of the parts they manufacture after the part has been installed. This data could be used for design purposes as well as a need for offering strategic warranties that would come with purchasing the part.

Accordingly, it is desirable to provide a system that is able to diagnose whether specific automotive parts are functioning or not. Furthermore, there is a need for the ability for owners to see the diagnosis as well as for others to have access to the data that is garnered from the diagnosis. There is also need for third parties to have access to the data a number of reasons, ranging from design to warranties.

SUMMARY OF THE INVENTION

It is therefore an aspect of the present invention to provide a diagnostic system for analyzing automotive parts to determine their condition.

It is another aspect of the present invention to provide a system for collecting and compiling this information that can be given to the customer as well as to the manufacturer or other third parties for analysis purposes.

The above and other aspects are achieved through the use of a novel combination of features as herein disclosed. In accordance with one embodiment of the present invention, a system is comprised of a computer that contains a display device such as monitor, an input device (e.g. a keyboard or a touch screen), a storage device such as a hard-drive, and software capable of collecting data. The data is collected from an adapter of which one end is attached to the computer and the other one end and attached to an automotive part.

In accordance with another embodiment, a starter is the automotive part used from which performance data is extracted. In the case of a starter, the system contains source or power leads that enable the starter to be tested. The source or power leads are connected to a power source such as a battery or transformer.

In accordance with another embodiment of the present invention, an alternator is tested by first being secured. Then the alternator is connected via belts to a motor. The motor is activated which rotates the belts that drive the alternator. At this point, performance data is collected from the alternator and transmitted to the computer via the adapter.

In accordance with another embodiment of the invention, a method is set forth for testing automotive. The method is comprised of connecting an adapter so that a first end is connected to a computer comprised of an (i) input device, (ii) a display device, (iii) a storage device and (iv) software code, and a second end is connected to the part; connecting the part to a pair of source leads that are connected to a power source, if the part requires power in order to be tested; testing the part by applying power and activating the part; transmitting test results from the part to the computer; and compiling and storing the test results.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a flowchart showing steps performed in a preferred embodiment of the invention.

DETAILED DESCRIPTION OF PREFERRED EMBODIMENTS OF THE INVENTION

Figure 1:
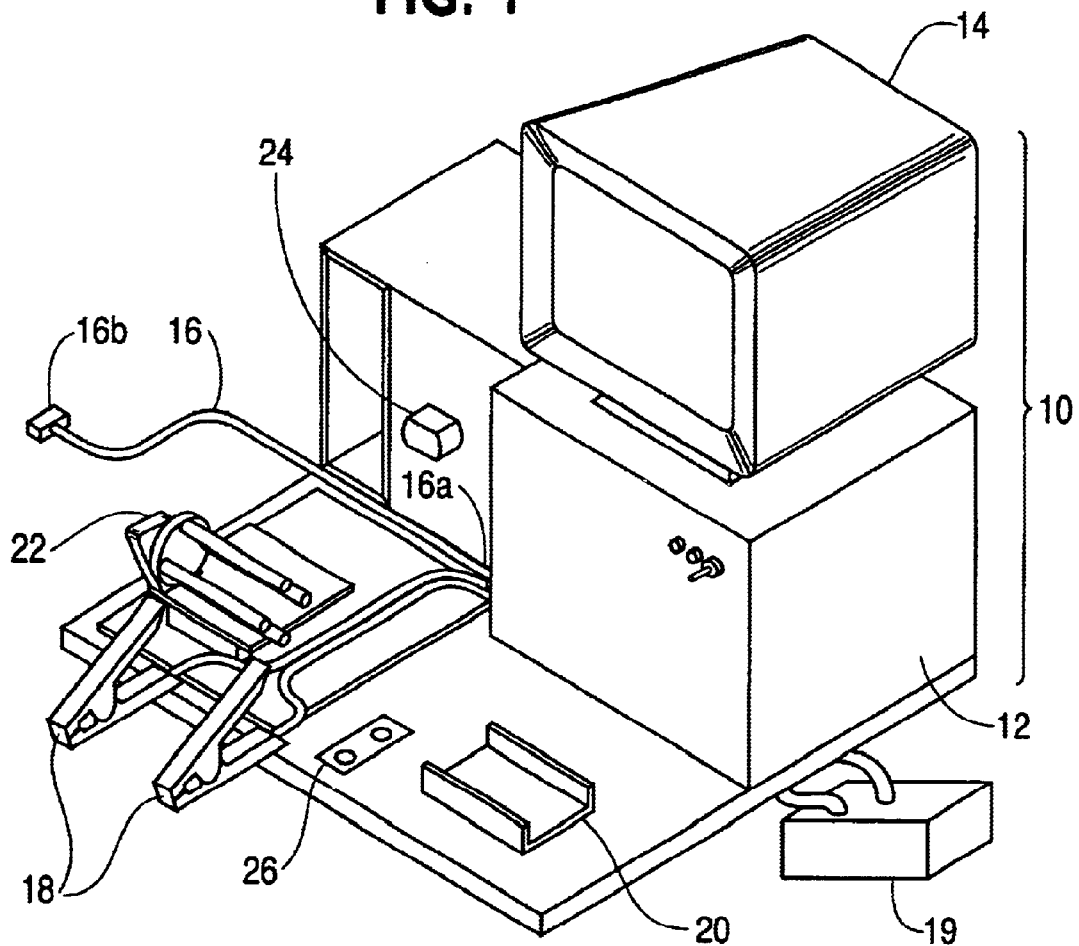
FIG. 1 provides a plan view illustrating several elements of a preferred embodiment of the present invention.

A preferred embodiment of the present invention provides a system that is comprised of a computer with input, output and storage devices. The computer is connected to one end of an adapter. The other end of the adapter is connected to the automotive part to receive and transmit performance data of the part while it is being tested. This information is collected and compiled by the computer. The results can be given to the customer to show whether the part has a problem or not. The results can also be forwarded to a remote location where manufacturers have access to the data for a number of reasons. The information is used to aid in the design of future parts and even help compile manufacturer warranties.

A preferred embodiment of the present inventive apparatus and method is illustrated in FIG. 1. A computer 10 is comprised of a microprocessor unit 12 and a display device 14. The display device 14 in the preferred embodiment is a touch screen, which is known in the art. In this embodiment, the display device 14 also acts as the input device 14. However, a conventional keyboard may alternatively be used for input. The microprocessor unit 12 contains a storage device such as hard-drive or even RAM to which a software application is stored. The software application is programmed to receive data from an adapter 16 of which one end 16a is attached to the computer through an expansion slot or even an existing port. The other end adapter 16b is attached to an automotive part such as an alternator, starter or generator.

The computer 10 is a microprocessor-based computer capable of executing software code that collects data via an external device. In the preferred embodiment, the computer 10 is a 350 MHz with a 7-gigabyte hard-drive. However, as one of skill in the art recognizes, almost any computer can suffice as an alternative. Handheld devices nay be used in place of or along with the computer 10.

A pair of source leads 18 are incorporated for automotive parts that require power in order to be tested, such as starters. The source leads 18 are connected to a power source 19. The power source 19 can be as simple as an automotive battery. However, the power source 19 is comprised of any power system capable of generating enough volts and amperage needed to run the particular piece of equipment being tested. The power source can be powered by connecting to a wall slot and include an internal power conversion system in order to power the automotive parts for testing purposes. In the preferred embodiment, a battery is used to more easily transport the system from location to location. The use of an internal transformer weighs down the system and more difficult for the user to transport.

Power to the computer 10 is handled in a number of variations. The computer 10 can plug into a conventional wall slot or the power source 19. In the preferred embodiment, the computer 10 is plugged available into a conventional 120-volt wall slot. A plug-in could also be available when the invention uses a transformer as the power source 19 for both testing and powering the computer 10.

The computer 10 in some instances does not need external power. For example, the computer 10 could be a portable system that has a rechargeable battery system.

The device also has a slot 20 for securing starters or another other pieces equipment that can be secured in such a manner. The slot 20 is a piece of metal with side mounts into which the starter would fit securely. Once the starter is in place, the test can proceed in a safe manner.

For alternators, the system has a two prong securing apparatus 22 that extends from a base. The base itself is connected to the system. In the preferred embodiment, the prongs are of a differing diameter to securely hold the alternator for testing. Once in place, the alternator is connected to a motor 24 through a belt system. The motor is used to turn the belts, which in turn drive the alternator. The test is simulating the actual conditions in which the part would operate.

Once the automotive part is safely and securely set in place, the test commences by activating the part. The adapter 16 takes performance readings from the automotive part and transmits them to the computer 10 where the software stores and secures the data.

The data from the test results are collected and the computer analyzes whether a new part is needed. A mechanic can print out the results and show the customer what is causing the problem.

Some of the parts that can be tested are sealed and are difficult to diagnose for problems. This test gives an instant analysis without having to guess as to whether the bearings are bad in the alternator or whether the starter is not generating enough power to turn the engine.

The computer can also be equipped with a modem. The modem can serve many purposes. One is to upgrade the software as newer versions become available. Another is to transmit test results to a remote location for analysis. This tool alone is a great benefit to companies as a way to reduce costs associated with warranty claims.

For example, an automotive parts chain sells their branded parts with a warranty. The test result data can be used to design a warranty that is advantageous to them and in turn reduces their costs. Therefore, the chain will not warranty parts that have a high failure rate but will warranty parts that do not. It is an inexpensive way to reduce costs and increase profitability.

Another aspect of the invention is to test parts as they come off the manufacturing line. Each part is tested by the invention and a report included in each purchase. Therefore, the manufacturer can more accurately remove bad parts from the distribution line.

An additional element of the invention is an emergency disable switch 26. When activated the switch 26 immediately ceases all testing on the automotive part. For alternator testing, the power to motor 24 is ceased. For a starter, the source leads 18 are disconnected from the power source. The emergency disable 26 can be a switch that takes both courses of action.

The software code helps gather and organize vital data. Therefore, the software code is programmed with identification of certain features to detect from the adapter 16. The following are a number of tests the invention is capable of performing on an alternator. One example of test the invention is the dash light test. The test is performed on internally regulated alternators. It represents the key/on, motor off, lamp check performed on most vehicles. Failure of this parameter may be due to a defective regulator L terminal or an open field circuit, open rotor or brushes.

The set point test is the output regulation voltage of the alternator. Excessively low or high readings here could result in under or overcharging the vehicle's battery.

The diode/stator voltage test represents the peak to peak AC ripple voltage measured at the battery output stud. This voltage reflects the health of the main rectifier diodes and the stator windings. If they are open or shorted diodes or shorted stator windings, the reading will be excessively high.

The diode trio will be checked for defective diodes. The test is a secondary rectifier output, used to supply current to the field circuit. A symptom of a bad diode trio is when the dashboard lamp in the vehicle continues to glow while the system is charging.

The lamp term test is provided to check for proper function of the regulator lamp terminal. When the alternator is charging properly in the vehicle, the dashboard indicator should be off.

The phase term test is for Delco CS type alternators. The phase terminal, "P" will have the same voltage as a stator tap, or approximately ½ Battery+.

The stator voltage is checked for any alternator, which has an external stator tap connection. The voltage is typically one-half of the output voltage.

Another test is the Aux B+. Some alternators such as the Motorola Style have an Auxiliary Output Terminal. The voltage here may be approximately equal to the B+ output terminal.

The Reg test automatically diagnoses the regulator terminals to check for proper function with respect to the intended application. This parameter depends on the type of alternator being tested.

For starters, one test is to check the starter output current at a specified voltage. A starter will test good of the amperage is within the specified range and the voltage at the battery clamp was ten volts (+/− one-tenth of volt).

FIG. 2 is a flowchart showing steps performed in a preferred embodiment of the invention. The initial step is connecting 30 an adapter 16 so that a first end 16b is connected to a computer 10. The computer is comprised of (i) an input device 14, (ii) a display device 14, (iii) a storage device and (iv) software code. A second end 16b of the adapter is connected to the part to be tested.

The next step is connecting 32 the part to be tested to a pair of source leads 18, if he part requires power in order to be tested. The source leads 18 are connected to a power source 19.

A further step is testing 34 the part by applying power, which in turn activates the part. Transmitting 36 test results from the part to the computer is then accomplished through the use of the adapter 16. The compiling 38 and storing of the results is the final step in the preferred embodiment.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An electronic testing apparatus for testing automotive parts, comprising:
    a microprocessor-based computer that comprises (i) an input device, (ii) a display device, (iii) a storage device and (iv) software code that resides on said storage device and retrieves testing results from the part in response to testing of the part, the computer;
    an adapter comprising a first end adaptable for connecting to various parts to be tested and attached to said computer that transmits the testing results from said automotive part to said computer;
    source leads that provide power to the part to be tested;
    a power source connected to said source lead to provide power to the part to be tested;
    a securing device for securely fastening an alternator; and
    a motor for turning belts that are attached to the alternator to drive the alternator for testing.

2. The electronic testing apparatus of claim 1, wherein said securing device is a two-prong device extending from a base.

3. The electronic testing apparatus of claim 2, wherein said two-prong device comprises prongs of differing diameters.

4. The electronic apparatus of claim 1, wherein said computer further comprises:
    a remote communication device for reporting a plurality of said test results to a remote location.

5. The electronic testing apparatus of claim 1, further comprising: an emergency disable that when activated discontinues all testing with said part.

6. The electronic testing apparatus of claim 1, further comprising: an output device wherein said test results are completed and compiled by said software are transmitted.

7. The electronic testing apparatus as in claim 6, wherein said output device is a printer.

8. An electronic testing apparatus for testing automotive parts, comprising:
    a micro-processor based computing means that comprises (i) an input means, (ii) a display means, (iii) a storage means and (iv) software code; that resides on said storage means and retrieves testing results from the part in response to testing the part; said computing means storing the results to said storage means;
    transmitting means for transmitting said testing results from the part to said microprocessor based computing means;
    means for providing power to the part to be tested;
    a securing means for securely fastening an alternator to the apparatus; and
    a means for turning belts that are attached to said alternator to drive said alternator for testing.

9. The electronic testing apparatus of claim 8, wherein said two-prong device is comprised on prongs of differing diameters.

10. The electronic testing apparatus of claim 8, wherein said microprocessor based means further comprises a remote communication means for reporting a plurality of said test results to a remote location.

11. The electronic testing apparatus of claim 8, further comprising an emergency disable means for disabling testing of the part when activated.

12. The electronic apparatus of claim 8, further comprising an output means for outputting test results completed and compiled by said software code.

13. The electronic testing apparatus of claim 12, wherein said output means is a printer.

14. A method for testing automotive parts comprising the steps of:
- connecting an adapter so that a first end is connected to a computer comprised of an (i) input device, (ii) a display device, (iii) a storage device and (iv) software code and a second end is connected to the part;
- connecting an alternator to a pair of source leads that are connected to a power source, if the part requires power in order to be tested;
- testing said part by applying power and activating said part;
- transmitting test results from the part to the computer;
- compiling and storing the test results;
- attaching an alternator to a securing device for safely testing the alternator;
- linking the alternator with belts to a motor; and
- activating the motors to drive the alternator with the belts to test the alternator.

15. The method for testing automotive parts of claim 14, further comprising the step of:
- transmitting the test results to a remote location with a remote communication device that is attached to the computer.

16. The method for testing automotive parts of claim 15, further comprising the step of:
- printing the test results with a printer that is attached to said computer.

17. The method for testing automotive parts of claim 14, further comprising the step of:
- disabling the testing of the parts with an emergency cut-off device that eliminates power to the source leads and ceases all power said motor driving said motor driving said alternator.

* * * * *